United States Patent
Sha et al.

(10) Patent No.: US 9,723,163 B2
(45) Date of Patent: Aug. 1, 2017

(54) ARRANGING A GROUP OF IMAGES TO BE DISPLAYED ON A DISPLAYING DEVICE OF AN INFORMATION PROCESSING APPARATUS

(71) Applicants: Peng Sha, Nagoya (JP); Jun Yamada, Nagoya (JP); Yoshito Hosoi, Nagoya (JP); Machiko Sakaguchi, Nagoya (JP)

(72) Inventors: Peng Sha, Nagoya (JP); Jun Yamada, Nagoya (JP); Yoshito Hosoi, Nagoya (JP); Machiko Sakaguchi, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 214 days.

(21) Appl. No.: 14/029,866

(22) Filed: Sep. 18, 2013

(65) Prior Publication Data
US 2014/0082562 A1   Mar. 20, 2014

(30) Foreign Application Priority Data

Sep. 20, 2012 (JP) .................................. 2012-207266

(51) Int. Cl.
*H04N 1/00* (2006.01)
*G06F 17/21* (2006.01)

(52) U.S. Cl.
CPC ....... *H04N 1/00503* (2013.01); *G06F 17/211* (2013.01); *H04N 1/0045* (2013.01); *H04N 1/00448* (2013.01); *H04N 1/00456* (2013.01)

(58) Field of Classification Search
CPC ........... H04N 1/00503; H04N 1/00448; H04N 1/0045; H04N 1/00456; G06F 17/211
(Continued)

(56) References Cited

U.S. PATENT DOCUMENTS 8,300,066 B2   10/2012   Li et al.
8,423,889 B1 *  4/2013   Zagorie et al. ............... 715/255
(Continued)

FOREIGN PATENT DOCUMENTS

CN   101740006 A   6/2010
CN   102196138 A   9/2011
(Continued)

OTHER PUBLICATIONS

Jan. 20, 2016—(CN) Notification of First Office Action—App 201310430561.0, Eng Tran.
(Continued)

*Primary Examiner* — Kieu Vu
*Assistant Examiner* — Roberto Borja
(74) *Attorney, Agent, or Firm* — Banner & Witcoff, Ltd.

(57) ABSTRACT

There is provided a non-transitory computer readable medium storing instructions that, when executed by a processor of an information processing apparatus including a displaying device, cause the processor to execute processes of receiving a designation of the group of images to be displayed on the displaying device, judging whether arrangement information representing an arranging direction of a group of images when displayed on the displaying device is associated with the designated group of images, displaying the designated group of images on the displaying device such that: (1) when the designated group of images is associated with the arrangement information, the designated group of images are displayed with the arranging direction represented by the arrangement information, and (2) when the designated group of images is not associated with the arrangement information, the designated group of images are displayed with a predetermined default arranging direction.

14 Claims, 11 Drawing Sheets

(58) Field of Classification Search
USPC .......................................................... 715/835
See application file for complete search history.

(56) References Cited

U.S. PATENT DOCUMENTS

| | | | |
|---|---|---|---|
| 8,806,375 B2 | 8/2014 | Tomita et al. | |
| 2002/0135621 A1* | 9/2002 | Angiulo et al. | 345/838 |
| 2002/0138513 A1* | 9/2002 | Korotney | G06F 17/3089 |
| | | | 715/234 |
| 2006/0120224 A1* | 6/2006 | Nakamura | G11B 27/034 |
| | | | 369/30.3 |
| 2009/0128507 A1 | 5/2009 | Hoshino et al. | |
| 2009/0146994 A1* | 6/2009 | Goh | 345/418 |
| 2010/0026706 A1* | 2/2010 | Yamaji | G11B 27/034 |
| | | | 345/594 |
| 2010/0118054 A1* | 5/2010 | Li et al. | 345/649 |
| 2011/0163971 A1* | 7/2011 | Wagner | G06F 3/04817 |
| | | | 345/173 |
| 2011/0231800 A1 | 9/2011 | Tomita et al. | |
| 2011/0237303 A1* | 9/2011 | Matsuda | G06F 3/0485 |
| | | | 455/566 |
| 2011/0279392 A1 | 11/2011 | Yamaguchi et al. | |
| 2012/0026522 A1 | 2/2012 | Igawa | |

FOREIGN PATENT DOCUMENTS

| | | |
|---|---|---|
| JP | 2003303061 A | 10/2003 |
| JP | 2009-048450 A | 3/2009 |
| JP | 2009-245037 A | 10/2009 |
| JP | 2010-277456 A | 12/2010 |
| JP | 2011237636 A | 11/2011 |
| JP | 2012027856 A | 2/2012 |

OTHER PUBLICATIONS

May 24, 2016—(JP) Notification of Reasons of Rejection—App 2012-207266; Eng Tran.

* cited by examiner

ARRANGING A GROUP OF IMAGES TO BE DISPLAYED ON A DISPLAYING DEVICE OF AN INFORMATION PROCESSING APPARATUS

CROSS-REFERENCE TO RELATED APPLICATION

This application claims priority under 35 U.S.C. §119 from Japanese Patent Application No. 2012-207266 filed on Sep. 20, 2012. The entire subject matter of the application is incorporated herein by reference.

BACKGROUND

Technical Field

Aspects of the present invention relate to technique of displaying a plurality of images with arranging the same in a certain direction.

Prior Art

Conventionally, there has been known a technique of displaying a plurality of images.

SUMMARY

When the plurality of images are displayed on a screen, an arranging direction may be arranged downward, rightward, leftward or combination of the same. In this specification, the arranging direction is a direction from a top to the last of the arranged images on the screen. Different users may wish to arrange the same images in different arranging directions. For example, when a plurality of photograph images are arranged, one user may think it preferable to arrange the same in a downward direction, while another user may think it desirable to arrange the same in a rightward direction.

In conventional art, such a fact that different users may wish different arranging directions has not been considered when a plurality of images are arranged on a screen. The present specification discloses a technique enabling an arrangement of a plurality of images in a user-desired arranging direction when a plurality of images are arranged.

According to aspects of the invention, there is provided a non-transitory computer readable medium storing instructions that, when executed by a processor of an information processing apparatus including a displaying device, cause the processor to execute processes of receiving a designation of a group of images to be displayed on the displaying device, judging whether arrangement information representing an arranging direction of a group of images when displayed on the displaying device is associated with the designated group of images, and (1) when the designated group of images is associated with the arrangement information, displaying the designated group of images on the displaying device in the arranging direction represented by the arrangement information, and (2) when the designated group of images is not associated with the arrangement information, displaying the designated group of images on the displaying device in a predetermined default arranging direction.

Various techniques disclosed in the present specification can be realized in various aspects which may include an information processing apparatus, image displaying method, a recording medium storing a computer-executable programs, and the like.

BRIEF DESCRIPTION OF ACCOMPANYING DRAWINGS

Figure 3:
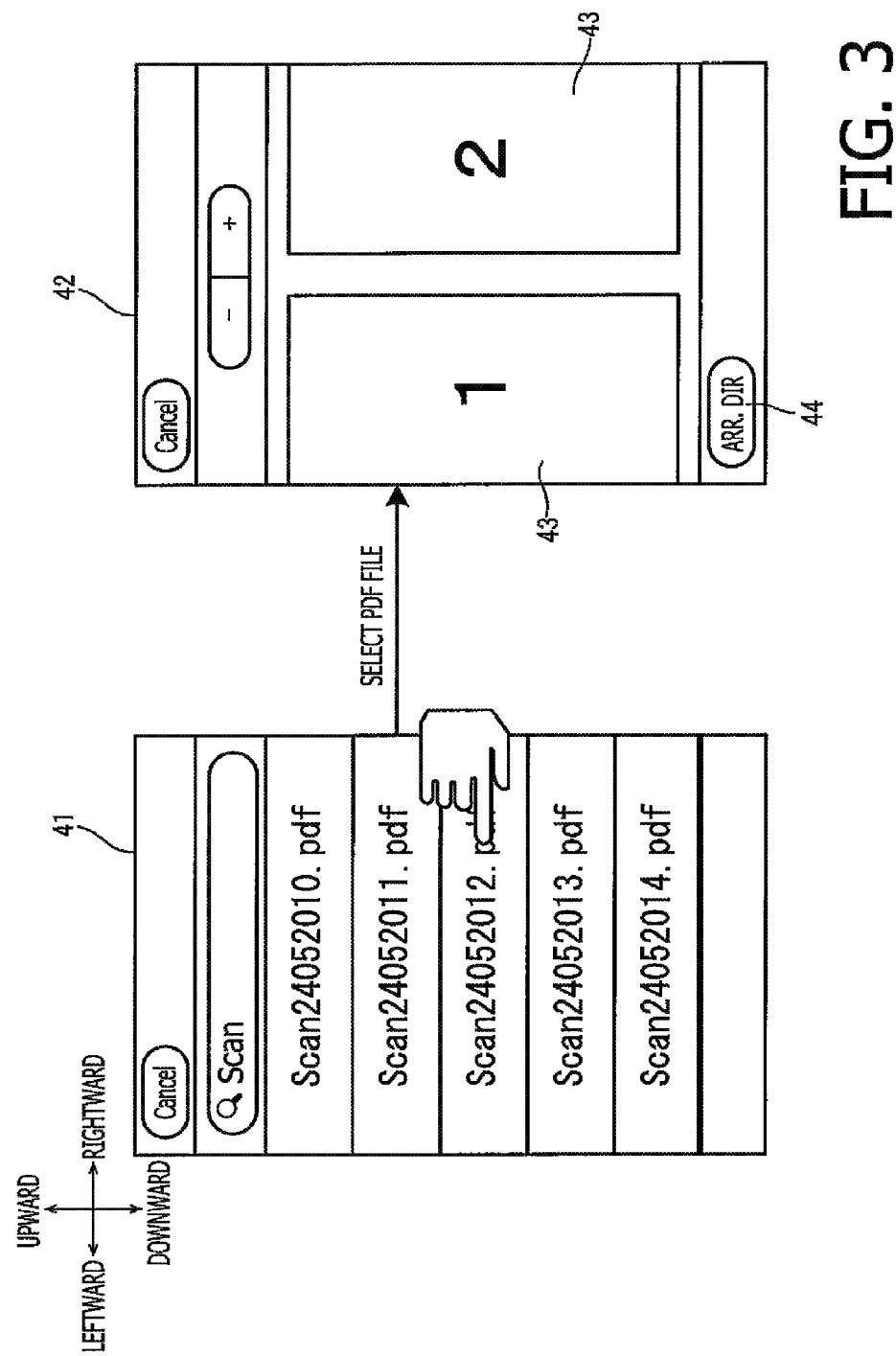

FIG. 3 schematically shows an example of a user interface of a display program.

Figure 4:
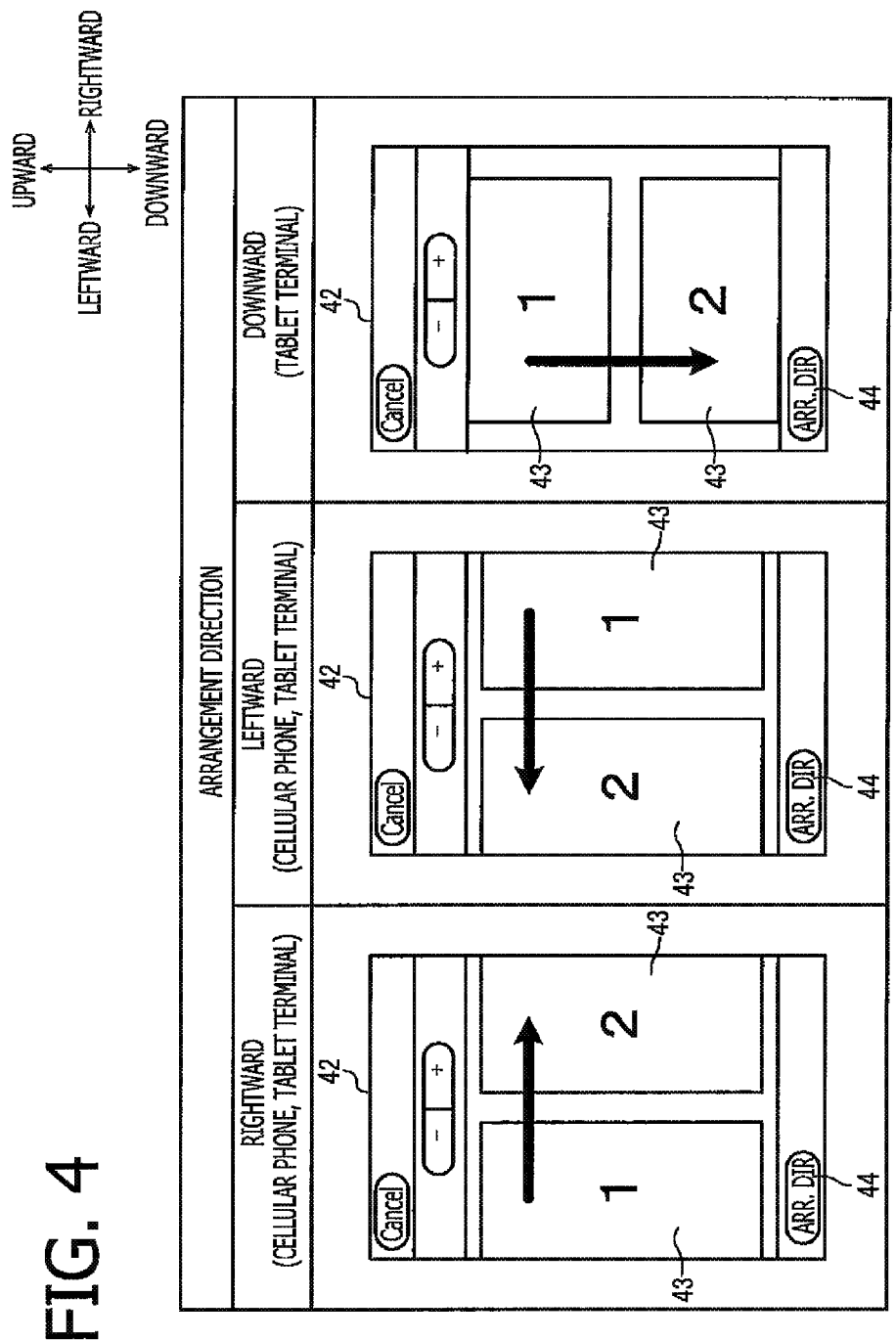

FIG. 4 illustrates arranging directions of images.

Figure 5:
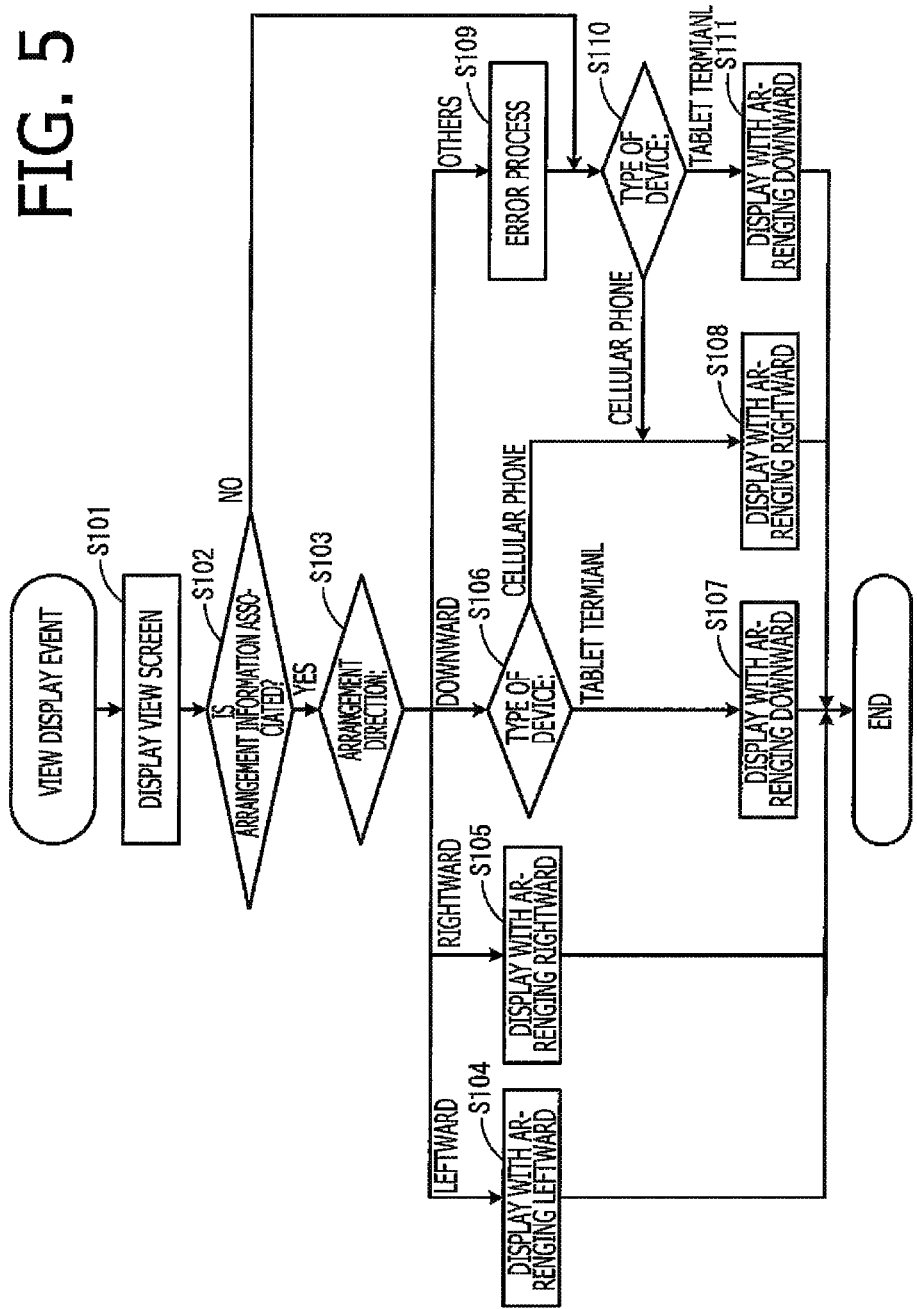

FIG. 5 is a flowchart of a process which is executed when a view format display event has occurred according to a first embodiment.

Figure 6:
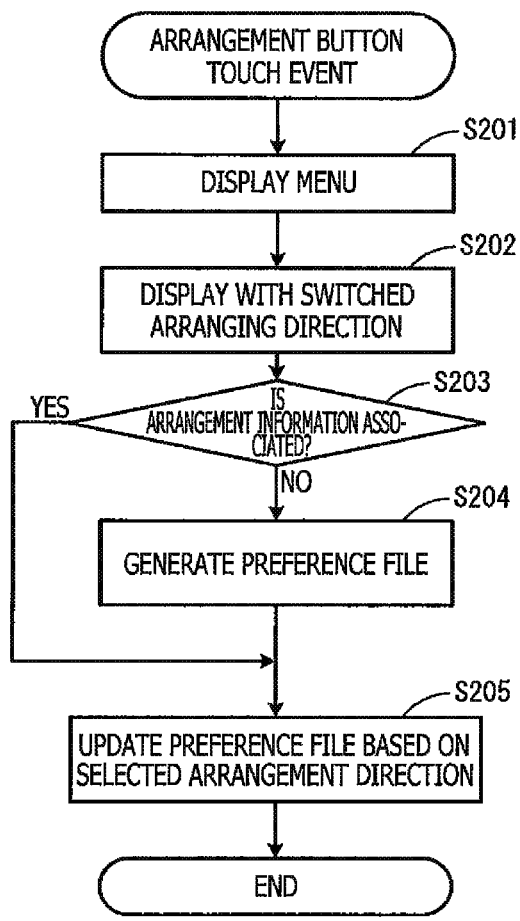

FIG. 6 is a flowchart of a process which is executed when a button touch event has occurred according to the first embodiment.

Figure 7:
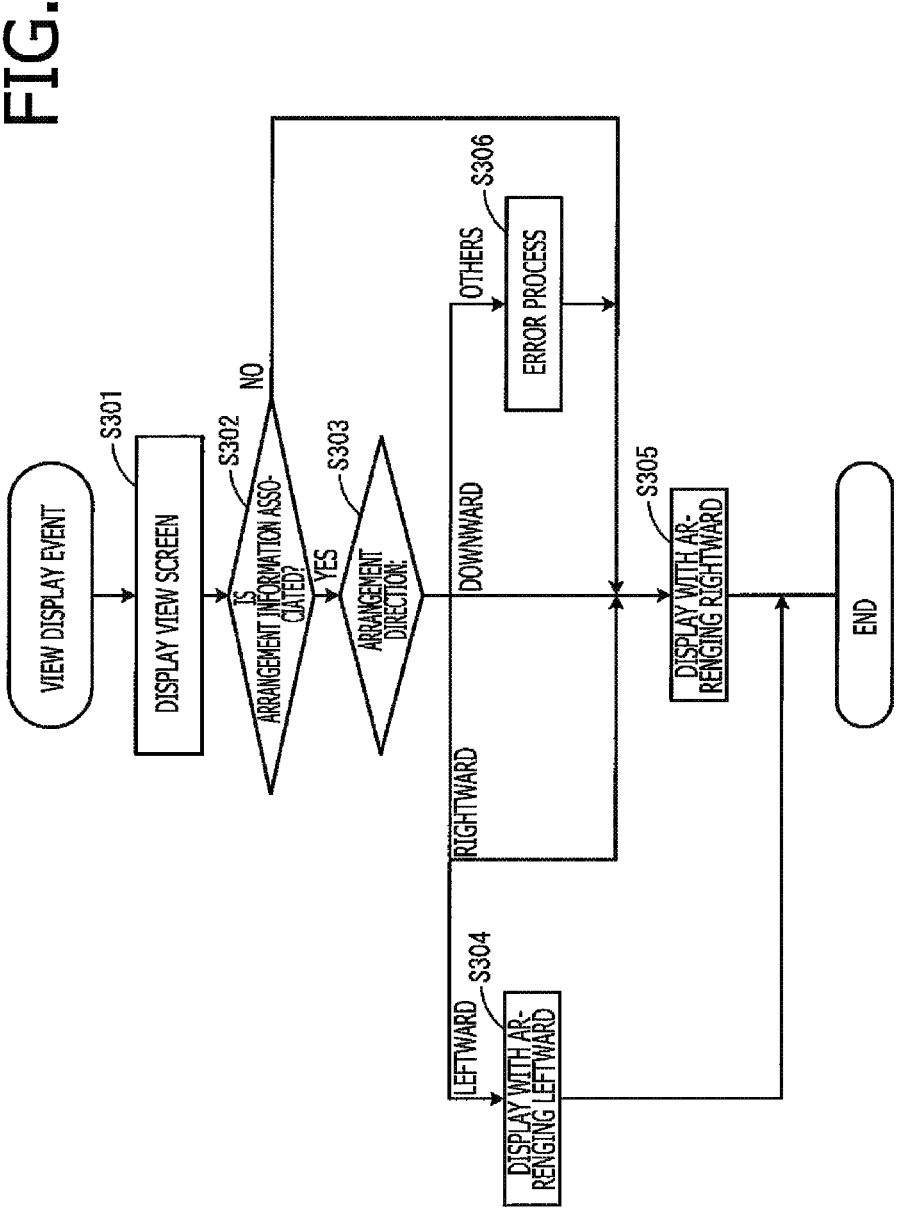

FIG. 7 is a flowchart of a process for the cellular phone, which is executed when a view format display event has occurred according to a second embodiment.

Figure 8:
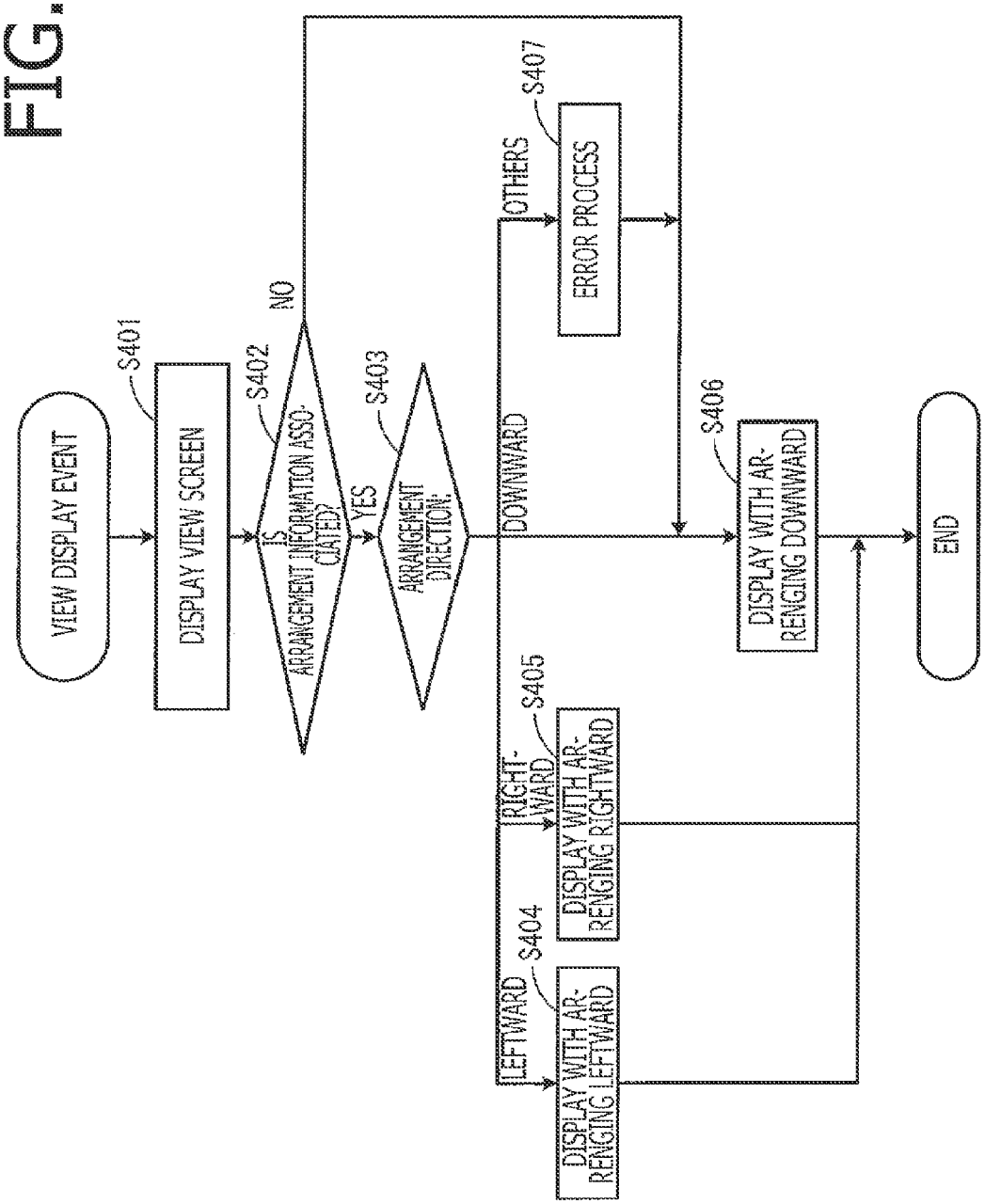

FIG. 8 is a flowchart of a process for the tablet terminal, which is executed when a display event has occurred.

Figure 9:
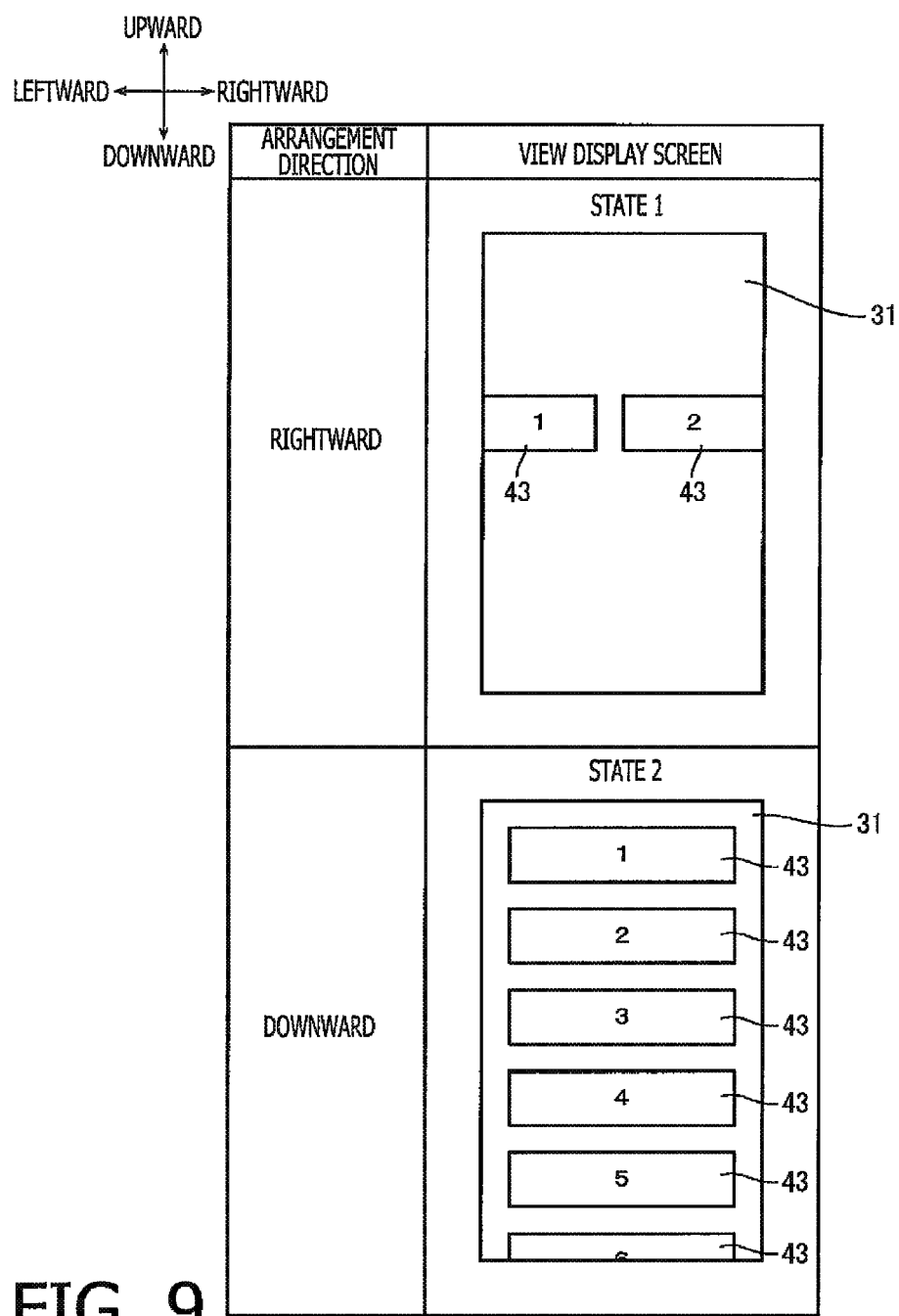

FIG. 9 schematically illustrates a dynamic determination of an arranging direction of images according to a third embodiment.

Figure 10:
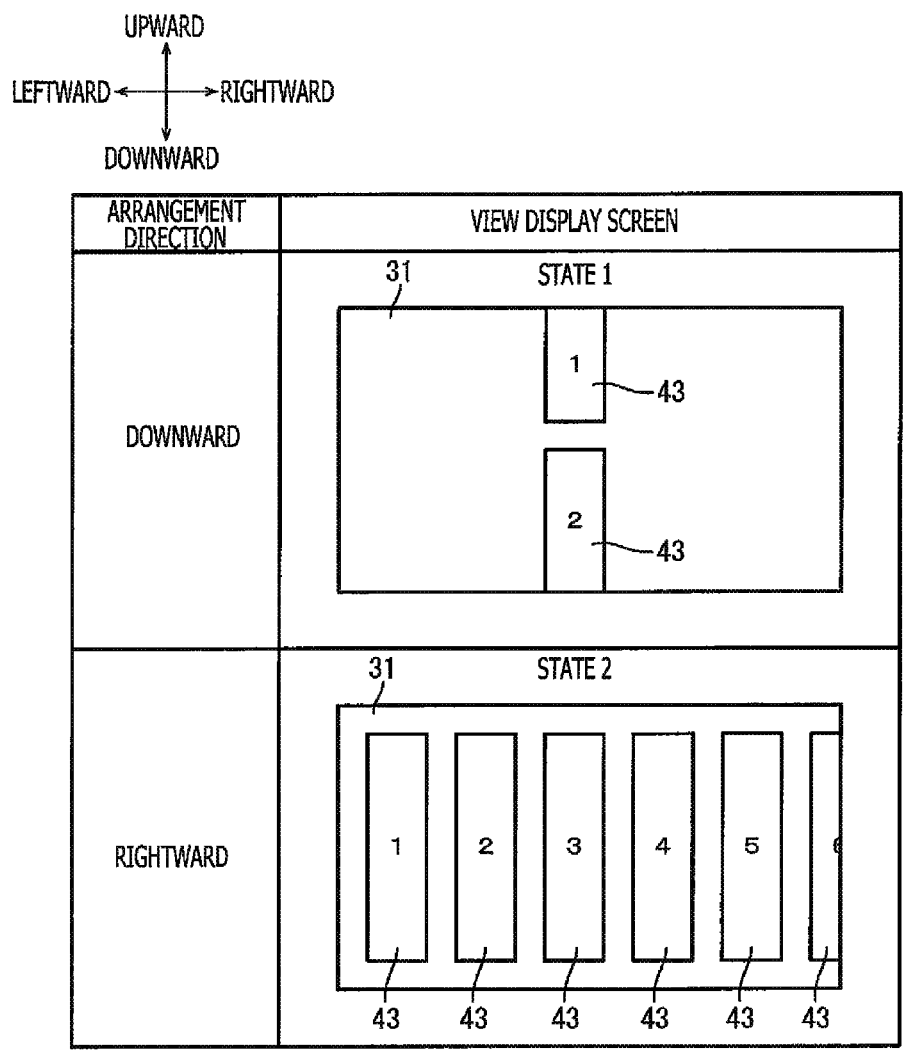

FIG. 10 schematically illustrates a dynamic determination of an arranging direction of images.

Figure 11:
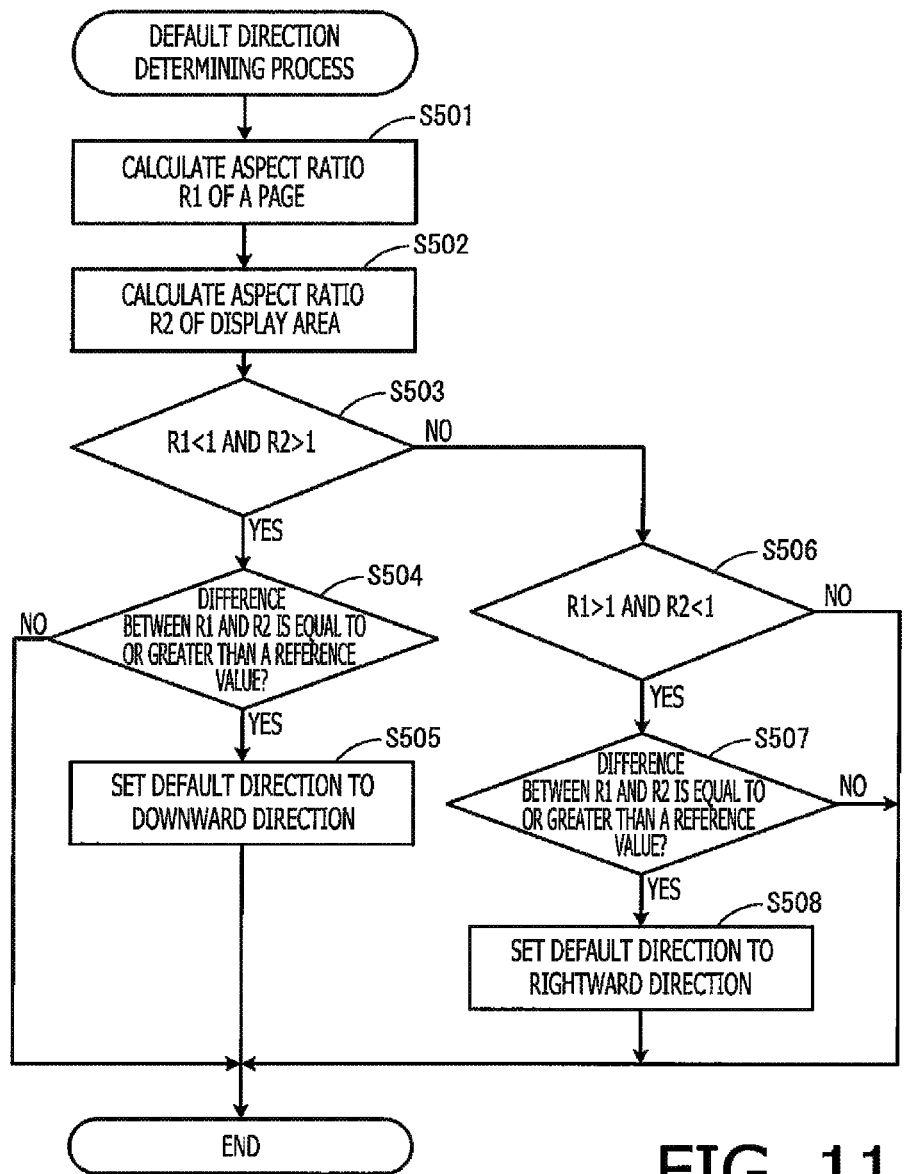

FIG. 11 is a flowchart illustrating a determination of an arranging direction of images.

DETAILED DESCRIPTION OF THE EMBODIMENTS

Embodiment 1

Referring to FIGS. 1-6, a first embodiment will be described.

(1) Information Processing Apparatus

Figure 1:
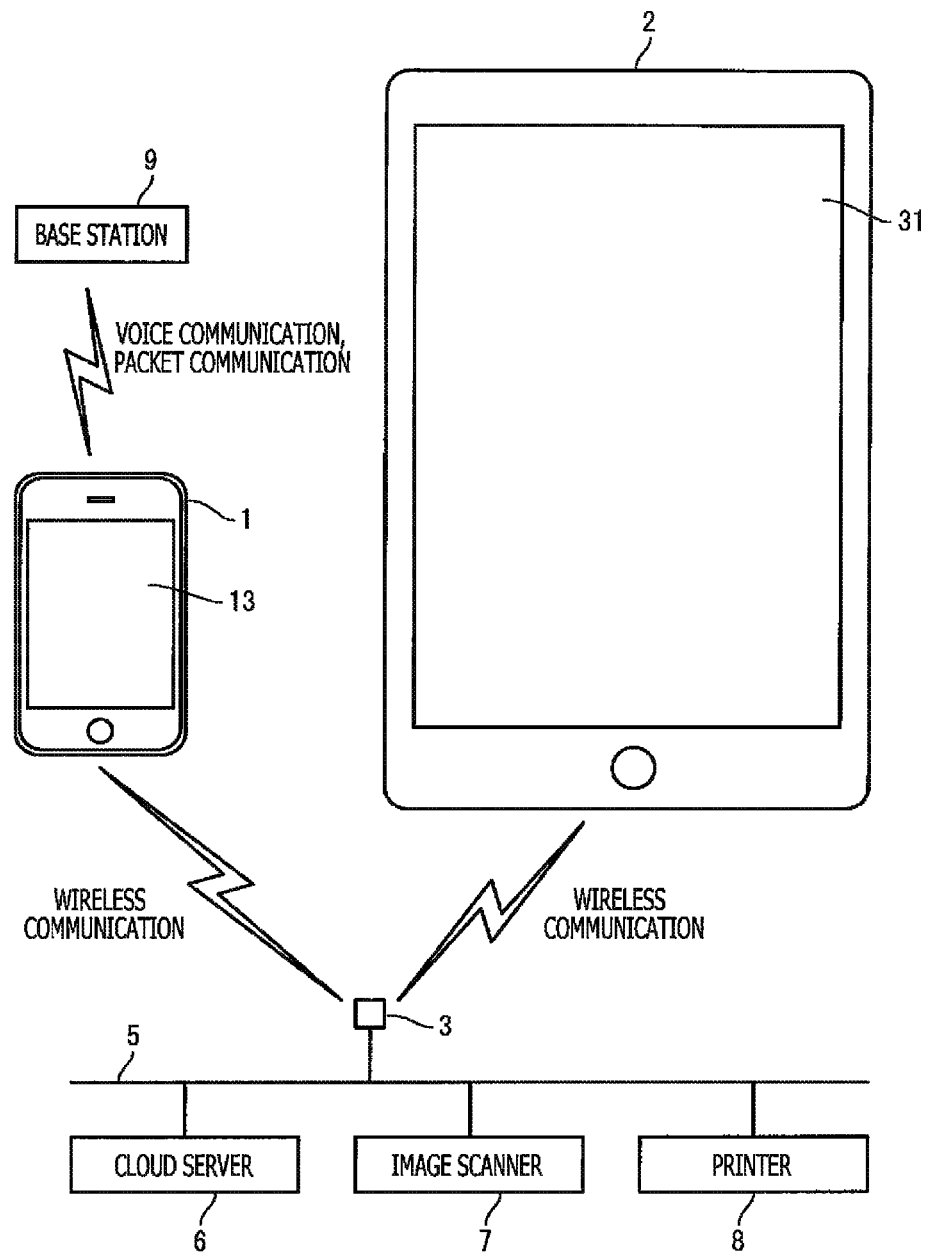
FIG. 1 shows an image processing system including a cellular phone and a tablet terminal connectable to a network according to an embodiment of the invention.

Referring to FIG. 1, a cellular phone 1 and a tablet terminal 2 according to a first embodiment will be described.

The cellular phone 1 is a so-called smartphone. The cellular phone 1 has a wireless communication function in addition to a telephone function. With the wireless communication function, the cellular phone 1 can be wirelessly connected to a communication network 5 such as a LAN (Local Area Network) or the Internet via a wireless access point 3.

The cellular phone 1 is capable of synchronizing programs and files with respect to a cloud server 6 which is also connected to the communication network 5. The cloud server 6 is an example of a server.

Further, when a display program 22 (see FIG. 2, described later) is executed, the cellular phone 1 capable of transmitting a command to execute scanning of an original to an image scanner 7 via the communication network 5. An image scanned by the image scanner 7 and generated thereby (hereinafter, such a generated image will be called as a page) is contained in a PDF (portable document format) file and transmitted to the cellular phone 1.

The cellular phone 1 is also capable of instructing a printer, which is connected to the communication network 5, to print an electronic file when the display program 22 is executed.

Functions of the tablet terminal 2 is substantially the same except that the tablet terminal 2 does not have a telephone function. The tablet terminal 2 has a larger display unit 31 which is larger than that of the cellular phone 1. For example, the cellular phone 1 may have a display unit 13 of which size is about ¼ inches, while the tablet terminal 2 may have a display unit 31 of which size is about 9 inches. It is also noted that aspect ratios of the display unit 13 of the cellular phone 1 and the display unit 31 of the tablet terminal 2 may be different.

According to the first embodiment, it is assumed that an operating system (OS) of the cellular phone 1 and an OS of the tablet terminal 2 are the same. That is, program developers can develop programs which runs both in the cellular phone 1 and the table terminal 2.

(2) Electric Configuration of Information Processing Apparatuses

Next, electric configurations of the cellular phone 1 and the tablet terminal 2 will be described.

Figure 2:
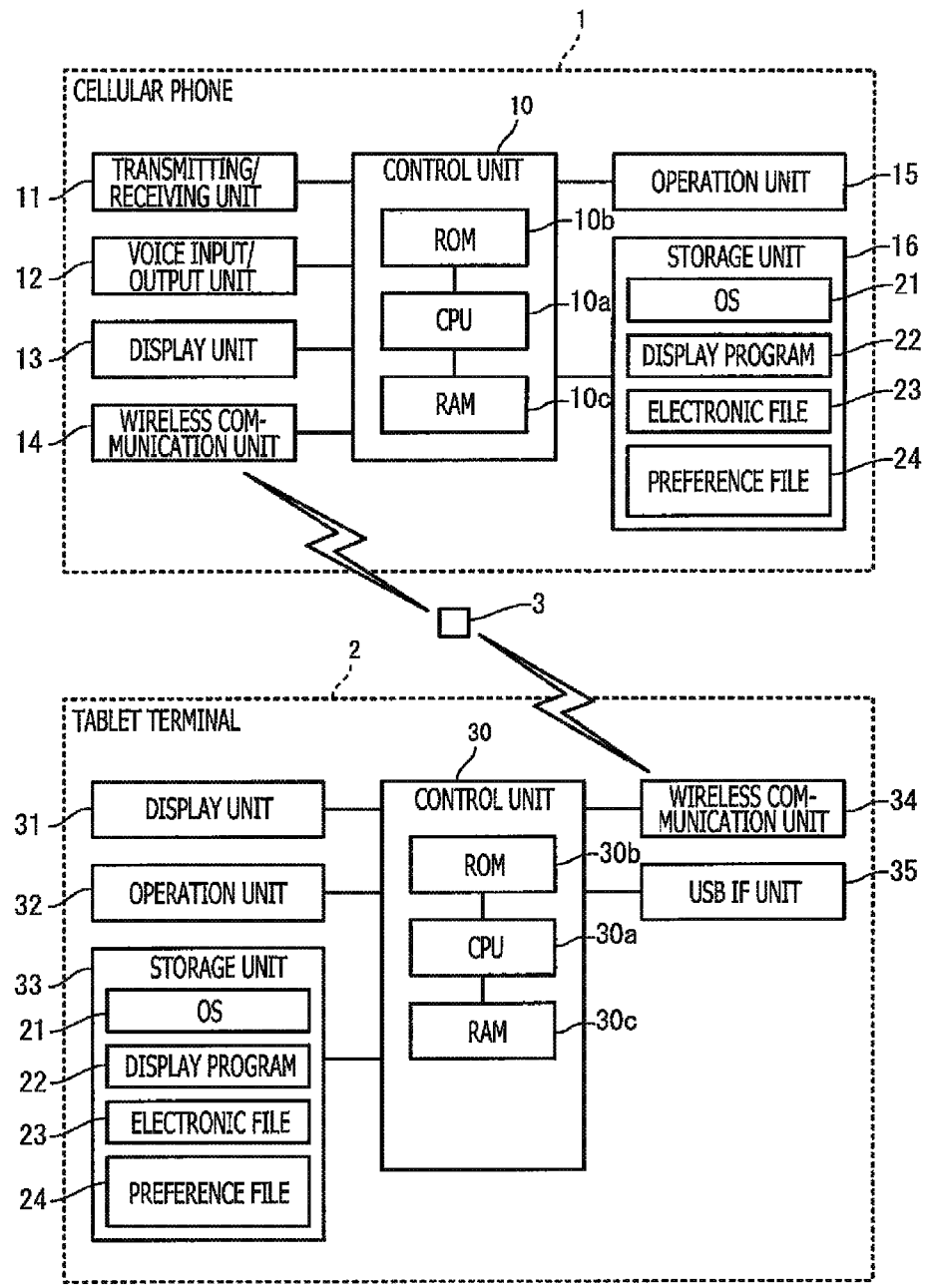
FIG. 2 is a block diagram showing an electrical configuration of the cellular phone and the tablet terminal shown in FIG. 1.

Referring to FIG. 2, the electric configuration of the cellular phone 1 will be described firstly. The cellular phone 1 has a processing unit 10, a transmitting/receiving unit 11, a voice input/output unit 12, a display unit 13, a wireless communication unit 14, an operation unit 15 and a storage unit 16.

The processing unit 10 includes a CPU (central processing unit) 10a, a ROM (read only memory) 10b, a RAM (random access memory) 10c. The CPU 10a controls various units of the cellular phone 1 by executing various programs stored in the ROM 10b and/or the storage unit 16. The ROM 10b stores programs to be executed by the CPU 10a. The RAM 10c serves as a main memory for enabling the CPU 10a to execute various processes.

The transmitting/receiving unit 11 has an antenna, an RF (radio frequency) circuit, a base band processor, and is configured to transmit/receive a voice signal. The transmitting/receiving unit 11 is also configured to perform a packet communication with a base station 9.

The voice input/output unit 12 has a microphone, a speaker and a voice processing circuit. A voice signal input through the microphone is transmitted to the base station 9 from the transmitting/receiving unit 11, while the voice signal received by the transmitting/receiving unit 11 from the base station 9 is output from the speaker.

The display unit 13 has a display device such as an LCD (liquid crystal display) and a display driving circuit for driving the display device.

The wireless communication unit 14 is configured to be compliant with Wi-Fi (registered trademark). The wireless communication unit 14 is wirelessly connected to the communication network 5 through the wireless LAN access point 3. It is noted that the wireless communication unit 14 may be configured to use another wireless communication standard other than the Wi-Fi.

The operation unit 15 has a touch panel which is substantially transparent and covers a displaying area of the display device provided to the display unit 13. The operation unit 14 also has a control circuit which drives the touch panel, and various operation buttons. The user can input telephone numbers and operate application programs by operating the operation unit 15.

The storage unit 16 is a unit (device) which has a non-volatile memory such as a flash memory and stores various programs and data. For example, in the storage unit 16, the display program 22, electronic files 23 displayed by the display program 22, and a preference file 24 are stored.

The electronic files 23 may include ones which were stored, in advance, when the cellular phone 1 is shipped from a manufacturer, ones obtained from the image scanner 7 via the wireless LAN and the like, and/or ones downloaded from a server or the like via the wireless LAN.

Further, the electronic files 23 may be PDF files, document files created using a word processing program, image files such as a TIFF (tagged image file format) file containing a plurality of images.

Next, the electrical configuration of the tablet terminal 2 will be described. The tablet terminal 2 has a processing unit 30, a display unit 31, an operation unit 32, a storage unit 33, a wireless communication unit 34 and a USB interface unit 35 which is indicated as USBIF in FIG. 2.

The processing unit 30 has a CPU 30a, a ROM 30b and a RAM 30c. The CPU 30a executes programs stored in the ROM 30b and the storage unit 33 to control each unit of the tablet terminal 2. The ROM 30b stores various programs to be executed by the CPU 30a and data. The RAM 30c serves as a main memory when the CPU 30a executes various processes.

The display unit 31 has a display device such as an LCD and a display driving circuit for driving the display device.

The operation unit 32 has a touch panel which is substantially transparent and covers a displaying area of the display device provided to the display unit 31. The operation unit 32 also has a control circuit which drives the touch panel, and various operation buttons.

The storage unit 33 is a unit (device) which has a non-volatile memory such as a flash memory and stores various programs and data. For example, in the storage unit 33, the OS 21, the display program 22, electronic files 23 displayed by the display program 22, and a preference file 24 are stored.

The wireless communication unit 34 is configured to be compliant with Wi-Fi (registered trademark). The wireless communication unit 34 is wirelessly connected to the communication network 5 through the wireless LAN access point. It is noted that the wireless communication unit 34 may be configured to us another wireless communication standard other than the Wi-Fi.

The USB interface unit 35 is used to connect the tablet terminal 2 with an external device such as a personal computer with a USB cable.

(3) Display Program

The display program 22 is for a process of displaying a plurality of images contained in the electronic file 23 (hereinafter, referred to as pages) in a line in the order of page numbers. According to the first embodiment, the display program 22 operates in each of the cellular phone 1 and the tablet terminal 2.

It is noted that the display program 22 may include functions of instructing the image scanner 7 to scan an original and/or instructing the printer 8 to print electronic files 23. Since such functions are well-known, description thereof will be omitted for brevity.

(3-1) User Interface of Display Program

The display program 22 is for a process of displaying a file designation screen 41 on the display unit 13 (or display unit 31), and a view display screen 42.

It is noted that the display program 22 also displays a function selection screen allowing the user to select a function of displaying view format display screen and a folder selection screen allowing the user to select a folder storing the electronic files 23 to be displayed. Since such functions are well-known, description thereof is omitted for brevity.

The file selection screen 41 is a screen for receiving a user input to select an electronic file 23. For the purpose of description, it is assumed that the user has already selected, on a folder selection screen, a folder in which a PDF file received from the image scanner 7 is stored. Therefore, on the file selection screen 41, file names of PDF files are shown as a list.

When the user selects one of the PDF files displayed on the file selection screen 41 from the list, the view display screen 42 is displayed on the display unit 13 (or display unit 31). Then, the CPU10a (or 30a), which executes the display program, displays the pages 43 contained in the selected PDF file 23 in the order of the page number with arranging the pages 43 in a row. When the number of pages is relatively large, the user can view all the pages 43 one by one by scrolling the same.

(3-2) Page Arrangement Direction

In the example shown in FIG. 3, the plurality of pages 43 are arranged in the rightward direction. In this specification, the term rightward direction is defined such that when a plurality of pages are arranged in a row on the display unit 13 (31), a direction from the top page to the last page is a rightward direction. In other words, when the pages are arranged in the rightward direction, a succeeding page is arranged on a right side of a current page (e.g., a second page is arranged on a right side of the first page, and a third page is arranged on a right side of the second page).

It is noted that the pages can be arranged in different directions. For example, when the display program 22 is executed in the cellular phone 1, the pages can be arranged in the rightward direction or a leftward direction (see FIG. 4). When the display program is executed in the tablet terminal 2, the pages can be arranged in the rightward direction, leftward direction or downward direction (see FIG. 4).

It is noted that, for the cellular phone 1, the pages are not arranged in the downward direction. Generally, cellular phones 1 are used in a portrait-oriented manner in which a longer side of the display unit 13 is oriented vertically, in comparison with the tablet terminal 2 or a personal computer. When the display unit 13 is used in the portrait-oriented manner, and the pages, which are portrait-oriented, are arranged in the downward direction, a longer scrolling operation is required in comparison with a case where the pages are arranged in the rightward direction or the leftward direction. That is, when the cellular phone 1 is used in the portrait-oriented manner and the pages are arranged in the downward direction, the user is required to move a finger by a large amount to display a succeeding page. Such an operation is no suitable to the cellular phone 1, and according to the embodiment, the pages are not arranged in the downward direction when the display program 22 is executed in the cellular phone 1.

Next, a relationship between the arranging direction of the pages and the contents of the pages will be displayed.

The rightward direction arrangement is appropriate when the pages contains photographs, and a horizontal writing text such as an English text. The rightward direction arrangement may not be appropriate for arranging the pages containing a vertical writing text such as a vertically-written Japanese text.

The leftward direction arrangement is suitable to display the pages containing the vertical writing text. However, in general, the leftward direction arrangement may not be suitable to display the pages containing photographs and the horizontal writing text. The downward direction arrangement is suitable to display the pages containing photographs and the horizontal writing text. The downward direction arrangement is also suitable to display the vertical writing text.

Incidentally, when the pages containing the photographs and/or horizontal writing text, some users may think the rightward direction arrangement is appropriate, while some may think the downward direction arrangement is suitable. When a default setting of the arrangement direction (hereinafter, referred to as a default direction) is the rightward direction, such a direction is not a desirable one for the users considering that the downward direction is appropriate.

Further, many users may think that the leftward arrangement is appropriate for displaying the pages containing the vertical writing text. If the default direction for the vertical text writing is the rightward direction, such a direction is not a desirable one for many users.

As described above, even when the same pages are displayed, the arrangement directions are different for different users. Further, the user-desired arrangement directions vary depending on the contents of the pages. Therefore, if the pages are always arranged in the default direction regardless of the users and/or contents of the pages, the pages may be arranged in the direction which is not intended by the user.

According to the embodiment, the CPU10a (30a) receives the user-desired arrangement direction of the pages of a PDF file 23, and arrangement information representing the user-desired arrangement direction is associated with the PDF file 23. Then, when a PDF file 23 is selected on the file selection screen 41 by the user, and when the arrangement information is associated with the selected PDF file 23, the pages of the selected PDF file 23 are arranged in the arrangement direction represented by the associated arrangement information.

(3-3) Association of Arrangement Information

The association of the arrangement information is performed as the user designates the arrangement direction on the view display screen 42, which will be described in detail with reference to FIG. 3.

Initially, none of the PDF files 23 are associated with arrangement information. The CPU10a (30a) displays the pages in the default direction when no arrangement information is associated with the PDF file 23 to be displayed. The default direction is different depending on the type of the information processing apparatus. The default direction will be described later.

The user cheeks the default direction (i.e., the pages displayed in the default direction), and touches an arrangement direction button 44 to display a menu allowing the user to select the intended arrangement direction. When the user uses the cellular phone 1, the menu shows two arrangement directions: the rightward direction and the leftward direction for selection. When the user uses the tablet terminal 2, the menu shows three arrangement directions: the rightward direction, the leftward direction and the downward direction for selection. The user can select the desired direction from the menu, which is set as the default setting of the arrangement direction.

The CPU10a (30a) switches the arrangement direction, upon selection by the user, and re-displays the pages in the switched (i.e., user-selected) arrangement direction. Further, the CPU10a (30a) creates a preference file 24 representing the user-selected arrangement direction. In the embodiment, the preference file 24 is described in a predetermined format.

For example, the preference file 24 contains "1" for the rightward direction, "2" for the leftward direction, "3" for the downward direction, and the like.

Then, the CPU10a (30a) stores the created preference file 24 with associating the same with the currently displayed PDF file 23 in the storage unit 16 (33). With this configuration, when the same PDF file is selected, the pages of the PDF file 23 can be displayed with being arranged in the user-desired direction from the beginning.

According to the embodiment, the association between the PDF file 23 and the preference file 24 are generated using the file name. Specifically, for example, the controller 10 (30) generates a file name by replacing the extension "pdf" with "pre" which the name of the preference file 24.

For example, it is assumed that the file name of a PDF file 23 is "Sca24052012.pdf". In this case, the name of the preference file 24 is changed to "Scan 24052012.pre". With this change, the PDF file 23 and the preference file 24 are associated with each other.

It is noted that, if the user has not designated the arrangement direction, the pages of the PDF file 23 will be arranged in the default direction, next time.

(3-4) Default Direction

As described before, the default direction is different depending on the type of the information processing apparatus which executes the display program 22.

If the information processing apparatus executing the display program 22 is the cellular phone 1, the default direction is the rightward direction. Generally, it may be frequently occur that a right-handed user holds the cellular phone 1 with the left hand, and performs the scrolling operation by moving a finger of the right hand from the right to the left to scroll the pages. Therefore, in the cellular phone 1, the default direction is determined considering that a slide operation from the right to left is appropriate to display the succeeding pages.

When the information processing apparatus executing the display program 2 is the tablet terminal 2, the default direction is the downward direction. It is because, the downward direction is appropriate for the pages containing the photographs, horizontal writing text and vertical writing text.

(3-5) Synchronization with Cloud Server

The OS 21 has a function of synchronizing with the cloud server 6. The CPU10a (30a) designates the type of the files to be synchronized and inputs the type into the OS 21, files of the designated type can be synchronized. For example, when the PDF files 23 and/or the preference files 24 are to be synchronized, the type of file can be designated by simply designating ".pdf" or ".pre".

The CPU10a (30a) requests the OS 21 for synchronization of the files upon starting the display program 22. The OS 21 starts synchronization with the cloud server 6 using a user account of the information processing apparatus in which the OS 21 is being executed, upon receipt of the request for the synchronization.

For example, it is assumed that the tablet terminal 2 receives a PDF file 23 from the image scanner 7, and the preference file 24 is associated with the PDF file 23 as the display program 22 is executed by the CPU10a. In such a case, the PDF file 23 and the associated preference file 24 are uploaded to the cloud server 6 with the synchronizing function of the OS 21.

If the tablet terminal 2 and the cellular phone 1 are set to synchronize with the cloud server 6, using the same user account, the PDF file 23 and the preference file 24 uploaded from the tablet terminal 2 is downloaded to the cellular phone 1 with the synchronization function of the OS 21. With this configuration, the same PDF file and the preference file 24 can be shared among a plurality of information processing apparatuses.

(3-6) Exception Process

When the PDF file 23 and the preference file 24 uploaded from the tablet terminal 2 is downloaded to the cellular phone 1 by the synchronization function of the OS 21, the preference file 24 representing the downward direction may be downloaded to the cellular phone 1, since the downward direction can be selected as the arrangement direction by the tablet terminal 2.

However, as described above, the CPU 10a of the cellular phone 1 does not arrange the pages in the downward direction. Therefore, in the above case (i.e., when the preference file 24 representing the downward direction as the arrangement direction is downloaded to the cellular phone 1), the CPU10a ignores the preference file 24. That is, when the display program 22 is executed in the cellular phone 1, and the preference file 24 represents the downward direction, the preference file 24 is ignored. It is noted that, when the preference file 24 is ignored, the CPU 10a displays the pages using the default direction.

(3-7) Flow of Display Program

The display program 22 is an event-driven type program. That is, the display program 22 is configured such that, when an event occurs, a process corresponding to the event (i.e., a so-called event handler) is executed. Hereinafter, the display program 22 is described at each occurrence of an event.

(3-7-1) View Display Event

A view display event occurs when an electronic file is selected on the file selection screen 41. The process when the view display event occurs will be described in detail with reference to FIG. 5. It is assumed that a PDF file 23 is selected as the electronic file.

In S101, the CPU 10a executing the display program displays the view display screen 42 on the display unit 13. It is noted that, when the display program 22 is executed in the tablet terminal 2, the display unit 13 in the following description should be interpreted as the display unit 31.

In S102, the CPU 10a judges whether the PDF file 23 selected on the file selection screen 41 is associated with the preference file 24 (which is indicated as arrangement information in FIG. 5). When the PDF file 23 is associated with the preference file 24 (S102: YES), the CPU 10a proceeds to S103. If the PDF file 23 is not associated with the preference file 24 (S102: NO), the CPU 10a proceeds to S110.

In S103, the CPU 10a determines the arrangement direction represented by the preference file 24. When the arrangement direction represented by the preference file 24 is the leftward direction, the CPU 10a proceeds to S104. When the arrangement direction represented by the preference file 24 is the rightward direction, the CPU 10a proceeds S106. Otherwise, the CPU 10a proceeds to S109.

In S104, the CPU 10a displays the pages contained in the selected PDF file 23 with arranging the same in the leftward direction.

In S105, the CPU 10a displays the pages contained in the selected PDF file 23 with arranging the same in the rightward direction.

In S106, the CPU 10a judges whether the above-described exception process should be executed. Specifically, the CPU 10a judges the type of the information processing apparatus which currently executes the display program 22. If the type of the information processing apparatus is the tablet terminal 2, it is possible to display the pages with arranging the same in the downward direction. In this case, the CPU 10*a* proceeds to S107. If the type of the information processing apparatus is the cellular phone 1, the pages cannot be arranged in the downward direction. In this case, the CPU 10*a* judges that the exception process should be executed. Thus, the CPU 10*a* ignores the preference file 24 and proceeds to S208.

In S107, the CPU 10*a* displays the pages contained in the selected PDF file 23 with arranging the pages in the downward direction.

In S108, the CPU 10*a* displays the pans contained in the selected PDF file 23 with arranging the pages in the default direction for the cellular phone 1, which direction is the rightward direction.

In S109, the CPU 10*a* displays an error message on the display unit.

In S110, the CPU 10*a* judges the type of the information processing apparatus executing the display program 22. If the type of the information processing apparatus is the cellular phone 1, since the default direction is the rightward direction, the CPU 10*a* proceeds to S108. If the type of the information processing apparatus is the tablet terminal 2, since the default direction is the downward direction, the CPU 10*a* proceeds to S111.

In S111, the CPU 10*a* displays the pages contained in the selected PDF file 23 with arranging the same in the downward direction which is the default direction.

(3-7-2) Direction Button Touch Event

A direction button touch event is an event which occurs when the user touches the arrangement direction button 44 on the view display screen 42.

In S201, the CPU 10*a* displays a menu allowing the user to select the arrangement direction on the display unit 13, and receives the user's selection of the arrangement direction.

In S202, the CPU 10*a* re-displays the pages with switching the arrangement direction to one selected by the user.

In S203, the CPU 10*a* judges whether the selected PDF file 23 is associated with the preference file 24 (which is indicated as the arrangement information in FIG. 6). If the preference file 24 is not associated (S203: NO), the CPU 10*a* proceeds to S204. If the preference file 24 is associated, the CPU 10*a* proceeds to S205.

In S204, the CPU 10*a* generates a preference file 24. In S205, the CPU 10*a* updates the preference file 24 in accordance with the arrangement direction selected in S201.

(3-7-3) Other Events

On the view display screen 42, a cancel button touch event occurs in addition to the above-described events. When the cancel button touch event occurs, the CPU 10*a* closes the view display screen 42 and displays the file selection screen 41.

According to the above-described control, the user can determine the desired arrangement direction based on the pages displayed on the view display window 42, and associate the PDF file 23 containing the pages with the preference file 24 representing the arrangement direction. Then, when the PDF file 23 is opened next time, because of the associated preference file 24, the pages of the PDF file 23 can be arranged in the user-desired direction from the beginning.

Further, according to the embodiment, if the arrangement direction represented by the preference file 24 is not suitable to the type of the information processing apparatus which executes the display program 22, the pages can be displayed in the default direction.

Further, according to the embodiment, the default direction can be switched depending on the type of the information processing apparatus.

Further, according to the embodiment, the user can change the arrangement direction of the pages from one which is currently used to another arrangement direction. Further, according to the embodiment, since the preference file 24 representing another direction is associated with the PDF file 23, when the PDF file 23 is selected next time, the "another" direction is uses from the beginning.

Furthermore, according to the embodiment, when the preference file 24 is associated with the PDF file 23, it is possible to update the preference file 24 in accordance with the switched arrangement direction switched by the user. If no preference file 24 is associated with the PDF file 23, a preference file representing the other direction (an arrangement direction designated by the user) is generated and associated with the PDF file 23. That is, if no preference file 24 is associated with the PDF file 23, a new preference file 24 is generated and associated with the PDF file 23.

Further, according to the embodiment, the preference file 24 is transmitted to the cloud server 6 using the synchronizing function of the OS 21, the preference file 24 can be shared among a plurality of information processing apparatuses.

Second Embodiment

Hereinafter, a second embodiment will be described.

According to the first embodiment, the display program 22 can be executed in both the cellular phone 1 and the tablet terminal 2. According to the second embodiment, the display program 22 includes different programs respectively for the cellular phone 1 and the tablet terminal 2. According to the second embodiment, it is assumed that the display program 22 for the cellular phone 1 does not operate in the tablet terminal 2, and the display program 22 for the tablet terminal 2 does not operate in the cellular phone 1.

(1) Display Program for Cellular Phone

Firstly, referring to FIG. 7, a process when the display program 22 for the cellular phone 1 is executed and a display event occurs will be described.

In S301, the CPU 10*a* displays a view display screen 42 on the display unit 13. In S302, the CPU10*a* judges whether the preference file 24 (indicated as arrangement information in FIG. 7) is associated with the PDF file 23 selected by the user. When the preference file 24 is associated with the PDF file 23 (S302: YES), the CPU10*a* proceeds to S303. If the preference file 24 is not associated with the PDF file 23 (S302: NO), the CPU10*a* proceeds to S305.

In S303, the CPU10*a* determines the direction represented by the associated preference file 24. That is, when the arrangement direction represented by the preference file 24 is the leftward direction, the CPU10*a* proceeds to S304, if the arrangement direction is the rightward direction or the downward direction, the CPU10*a* proceeds to S305, if the arrangement direction is the other direction, the CPU10*a* proceeds to S306.

In S304, the CPU10*a* displays the pages contained in the selected PDF 23 with arranging the same in the leftward direction.

In S305, the CPU10*a* displays the pages of the selected PDF file 23 with arranging the same in the rightward direction.

In S306, the CPU10a displays an error message on the display unit 13. Thereafter, the CPU10a proceeds to S305, and displays the pages with the arranging the same in the rightward direction.

(2) Display Program for Tablet Terminal

Next, referring to FIG. 8, the display program for the tablet terminal 2, when the display event of the view display screen occurs, will be described.

In S401, the CPU30a displays the view display screen 42 on the display unit 31. In S402, the CPU30a judges whether the preference file 24 is associated with the selected PDF file 23. If the preference file 24 is associated with the selected PDF file 23, the CPU30a proceeds to S403, while if the preference file 24 is not associated with the selected PDF file 23, the CPU30a proceeds to S406.

In S403, the CPU30a proceeds to S404 if the arrangement direction represented by the preference file 24 is leftward, to S405 if the arrangement direction represented by the preference file 24 is rightward, and to S406 if the arrangement direction represented by the preference file 24 is downward. Otherwise, the CPU30a proceeds to S407.

In S404, the CPU30a displays the pages contained in the selected PDF file 23 with arranging the same in the leftward direction.

In S405, the CPU30a displays the pages contained in the selected PDF file 23 with arranging the same in the rightward direction.

In S406, the CPU30a displays the pages contained in the selected PDF file 23 with arranging the same in the downward direction.

In S407, the CPU30a displays an error message on the display unit 31, and then proceeds to S406 to display the pages with arranging the same in the downward direction.

(3) Effect of the Embodiment

According to the second embodiment described above, by associating the preference file 24 indicative of the arrangement direction with the PDF file 23, when the pages contained in the PDF file 23 are opened next time, the pages are arranged in the user-desired direction from the beginning.

Third Embodiment

Next, a third embodiment will be described referring to FIGS. 9-11.

According to the second embodiment, the default direction of the tablet terminal 2 is the downward direction. According to the third embodiment, the default direction of the tablet terminal 2 is dynamically determined.

Initially, referring to FIGS. 9 and 10, dynamic determination of the default direction by the CPU30a is described.

FIG. 9 shows a case where pages 43, each of which extends in the right-and-left direction, are displayed on a portrait-oriented display area of the display unit 31, with arranged in the rightward direction (state 1). In this case, an unused area which is not used to display the pages 43 is relatively large within the displaying area of the display unit 31. This problem is resolved if the pages 43 are arranged in the direction of a short side of each page 43 (i.e., downward direction) and the displaying area can be effectively used (state 2).

FIG. 10 shows another case where pages 43, each of which extends in the up-and-down direction, are displayed on a landscape-oriented display area of the display unit 31, with arranged in the downward direction (state 1). Also in this case, an unused area which is not used to display the page 43 is relatively large within the displaying area of the display unit 31. This problem is resolved if the pages are arranged in the direction of a shorter side of each page 43 (i.e., in the rightward direction) and the displaying area can be effectively used (state 2).

According to the third embodiment, the CPU30a determines the arrangement direction as follows. When each page 43 is portrait-oriented and the displaying area is landscape-oriented, or when each page 43 is landscape-oriented and the displaying area is portrait-oriented, the CPU30a judges whether a difference between the aspect ratio of the page 43 and the aspect ratio of the displaying area is equal to or greater than a predetermined reference value. If the difference is equal to or greater than the predetermined reference value, the default direction is changed to a direction along the shorter side of the page 43.

Specifically, the display program 22 for the tablet terminal 2 according to the third embodiment is configured such that the CPU30a, which executes the display program 22, execute a process of determining the default direction before S401 of the process shown in FIG. 8.

Referring to FIG. 11, a process of determining the default direction will be described. In S501, the CPU30a calculates the aspect ratio R1 of the page 43 in accordance with equation (1) below.

$$R1 = Y1/X1 \tag{1}$$

where, Y1 is a height of the page, and X1 is a width of the page.

In S502, the CPU30a calculates the aspect ratio R2 of the displaying area of the display unit 31 in accordance with equation (2) below.

$$R2 = Y2/X2 \tag{2}$$

where, Y2 is a height of the displaying area, and X2 is a width of the displaying area.

In S503, the CPU30a judges whether the page is landscape-oriented and the displaying area is portrait-oriented, or not. Specifically, the CPU30a judges whether in equations (3) and (4) are satisfied.

$$R1 < 1 \tag{3}$$

$$R2 > 1 \tag{4}$$

When both in equations (3) and (4) are satisfied, the CPU30a proceeds to S504. When at least one of the in equations (3) and (4) is not satisfied, the CPU30a proceeds to S506.

In S504, the CPU30a judges whether the difference between R1 (the aspect ratio of the page) and R2 (the aspect ratio of the displaying area) is equal to or greater than the predetermined reference value. If the difference is equal to or greater than the predetermined reference value, the CPU30a proceeds to S505, if the difference is smaller than the predetermined reference value, the CPU30a terminates the process and returns to the process when the view display screen display event occurs. The predetermined reference value can be determined arbitrarily by the user.

In S505, the CPU30a changes the default direction to the downward direction. The downward direction is a direction along the shorter side of the page.

In S506, the CPU30a judges whether the page is portrait-oriented and the displaying area is landscape-oriented. Specifically, the CPU30a judges whether both in equations (5) and (6) are satisfied.

$$R1 > 1 \tag{5}$$

$$R2 < 1 \tag{6}$$

The CPU30*a* proceeds to S507 if both in equations (5) and (6) are satisfied. If at least one of in equations (5) and (6) is not satisfied, the CPU30*a* terminates the process, and returns to the process for view display event (i.e., modified FIG. 8).

In S507, the CPU30*a* judges whether the difference between R1 (the aspect ratio of the page) and R2 (the aspect ratio of the displaying area) is equal to or greater than the predetermined reference value. If the difference is equal to or greater than the predetermined reference value, the CPU30*a* proceeds to S508, while if the difference is smaller than the predetermined reference value, the CPU30*a* terminates the process and returns to the process for view display event (i.e., modified FIG. 8). In S508, the CPU30*a* changes the default direction to the rightward direction. It is noted that the rightward direction is a direction along the shorter side of the page 43.

The default direction determining process is described above. According to the third embodiment, if the default direction is changed to the rightward direction, and if it is judged that the preference file 24 is not associated with the PDF file 23 (S402: NO) or after S407 is executed, the CPU 30*a* arranges the pages in accordance with the default direction which has been changed in S505 or S508, instead of executing S406.

According to the above-described configuration, the displaying area of the display unit 31 is effectively used.

Other Embodiments

It is noted that the present invention should not be limited to the above-described embodiments, and can be modified in various ways as indicated below. Such modifications should be included in the scope of the present invention.

According to the first embodiment, the same display program can be executed in the cellular phone 1 and in the tablet terminal 2. It should be noted that the display program 22 may be executed in the personal computer in addition to the cellular phone 1 and the tablet terminal 2. For example, Java (registered trademark), which is a program language, uses an intermediate code as an execution file. If an apparatus (e.g., the cellular phone 1, the tablet terminal 2, and the personal computer) has a Java execution environment in which the intermediate code can be interpreted, the same program can be executed in the different apparatuses (e.g., the cellular phone 1, the tablet terminal 2, and the personal computer). In such a case, the personal computer and the tablet terminal 2 may be judged to be the same type of information processing apparatus.

According to the second embodiment, different display programs are provided respectively for the cellular phone 1 and the tablet terminal. Instead of or in addition to the display program for the tablet terminal 1, a display program for the personal computer may be provided. In this case, the processes for the personal computer may be substantially the same as those for the tablet terminal 1.

According to the above-described embodiments, a plurality of information processing apparatuses may share the PDF files 23 and the preference files 24 via the cloud server 6. Instead of the cloud server, a generally employed file server may be used to share the files.

For example, the PDF files and the preference files 24 may be transmitted to a file server instead of the cloud server 6. Then, the user is allowed to select a folder of the file server, where the PDF files 23 and the preference files 24 are stored.

In the above-described embodiments, the pages (plurality of pages) are contained in one file as an image group. This configuration is only an example, and the plurality of pages may be those contained in on folder. In this case, the pages may be contained in different files, respectively, or some of the pages may be contained in the same file. By storing the preference file 24 in the folder, the preference file 24 may be associated with the folder.

In the above-described embodiment, the pages are not arranged in the downward direction when the cellular phone 1 is used. However, such a configuration is only an exemplary one, and even when the cellular phone 1 is used, the pages may be arranged in the downward direction.

According to the above-described embodiment, the pages are arranged in one row (i.e., one dimension, or one direction). It is possible to arrange the pages two-dimensionally. In such a case, for example, the pages are arranged from an upper position to a lower position in one line, similarly in a left line, and repeats the arrangement similarly. For another example, the pages are arranged from an upper position to a lower position in one line, similarly in a right line, and repeats the arrangement similarly. Alternatively, the pages are arranged from a left position to a right position in one row, similarly in a next row below the previous row, and repeats the arrangement similarly.

What is claimed is:

1. A non-transitory computer readable medium storing instructions that, when executed by a processor, cause an information processing apparatus including a displaying device to execute:
   receiving a designation of a group of images to be displayed on the displaying device and scrollable via the displaying device;
   determining whether the designated group of images is associated with arrangement information representing an arranging direction of images when displayed on the displaying device and a scrolling direction for scrolling the images; and
   displaying a first portion of the designated group of images on the displaying device, wherein displaying the first portion of the designated group of images comprises:
      when the designated group of images is associated with the arrangement information,
         determining whether a device-type of the information processing apparatus is a first device-type or a second device-type;
         determining whether the arranging direction represented by the arrangement information associated with the designated group of images is permitted for the determined device-type; and
         in response to determining that the arranging direction is not permitted for the determined device-type, displaying the first portion of the designated group of images on the displaying device as virtually arranged in a predetermined default arranging direction of the determined device-type and scrollable in a direction along the predetermined default arranging direction, and
      when the designated group of images is not associated with the arrangement information, displaying the first portion of the designated group of images on the displaying device as virtually arranged in the predetermined default arranging direction and scrollable in the direction along the predetermined default arranging direction,
   wherein the arranging direction in parallel with a longer side of a display area of the displaying device is not permitted for the first device-type, wherein a predetermined default arranging direction of the first device-type is a direction in parallel with a shorter side of the display area, and wherein a predetermined default arranging direction of the second device-type is a direction in parallel with the longer side of the display area.

2. The non-transitory computer readable medium according to claim 1, wherein the instructions cause the information processing apparatus to further execute:

receiving a user input to change the arranging direction of the first portion of the designated group of images displayed on the displaying device from a current arranging direction to a designated arranging direction different from the current arranging direction;

re-displaying the first portion of the designated group of images as virtually arranged in the designated arranging direction in response to receipt of the user input; and associating the designated arranging direction with the designated group of images.

3. The non-transitory computer readable medium according to claim 2, wherein the instructions cause the information processing apparatus to further execute:

determining whether the arrangement information has already been associated with the designated group of images;

when the designated group of images is associated with the arrangement information,
updating the arrangement information with the designated arranging direction;

when the designated group of images is not associated with the arrangement information,
generating new arrangement information representing the designated arranging direction; and
associating the generated new arrangement information with the designated group of images.

4. The non-transitory computer readable medium of claim 3, wherein the instructions, when executed by the processor, further cause the information processing apparatus to execute:

generating a preference file in which the generated new arrangement information is to be stored, wherein a file name of the preference file comprises a character string identical to a character string of a file name of an electronic file comprising the designated group of images.

5. The non-transitory computer readable medium according to claim 1, wherein the information processing apparatus is connected to a server, and wherein the instructions cause the information processing apparatus to transmit the arrangement information to the server.

6. The non-transitory computer readable medium according to claim 1, wherein the instructions further cause the information processing apparatus to execute:

when the designated group of images are portrait-oriented and the display area of the displaying device is landscape-oriented, or when the designated group of images are landscape-oriented and the display area of the displaying device is portrait-oriented, judging whether a difference between an aspect ratio of the designated group of images and an aspect ratio of the display area is equal to or more than a predetermined reference value; and changing the predetermined default arranging direction to a direction in parallel with a direction in which a shorter side of the designated group of images extends if the difference between the aspect ratio of the designated group of images and the aspect ratio of the display area is equal to or more than the predetermined reference value.

7. The non-transitory computer readable medium of claim 1, wherein the arrangement information is stored in a preference file.

8. The non-transitory computer readable medium of claim 1, wherein the instructions, when executed by the processor, further cause the information processing apparatus to execute:

displaying a second portion of the designated group of images on the displaying device, wherein displaying the second portion of the designated group of images comprises scrolling the designated group of images in a direction along the arranging direction when the designated group of images is associated with the arrangement information, and in the direction along the predetermined default arranging direction when the designated group of images is not associated with the arrangement information.

9. An information processing apparatus, comprising:
a displaying device;
at least one processor; and
memory storing instructions which, when executed by the at least one processor, cause the at least one processor to:

receive a designation of a group of images to be displayed on the displaying device and scrollable via the displaying device;

determine whether the designated group of images is associated with arrangement information representing an arranging direction for images and a scrolling direction for scrolling the images; and display a portion of the designated group of images on the displaying device, wherein displaying the portion comprises:

when the designated group of images is associated with the arrangement information,
determining whether a device-type of the information process apparatus is a first device-type or a second device-type;
determining whether the arranging direction represented by the arrangement information associated with the designated group of images is permitted for the determined device-type; and
in response to determining that the arranging direction is not permitted for the determined device-type, displaying the portion of the designated group of images on the displaying device as virtually arranged in a predetermined default arranging direction of the determined device-type and scrollable in a direction along the predetermined default arranging direction, and when the designated group of images is not associated with the arrangement information, displaying the portion of the designated group of images on the displaying device as virtually arranged in the predetermined default arranging direction and scrollable in the direction along the predetermined default arranging direction, wherein the arranging direction in parallel with a longer side of a display area of the displaying is not permitted for the first device-type, wherein a predetermined default arranging direction of the first device-type is a direction in parallel with a shorter side of the display area, and wherein a predetermined default arranging direction of the second device-type is a direction in parallel with the longer side of the display area.

10. The information processing apparatus according to claim 9, wherein the memory stores further instructions which, when executed by the at least one processor, cause the at least one processor to:

receive a user input to change the arranging direction of the portion of the designated group of images displayed on the displaying device from a current arranging direction to a designated arranging direction which is different from the current arranging direction;

re-display the portion of the designated group of images as virtually arranged in the designated arranging direction in response to receipt of the user input; and associate the designated arranging direction with the designated group of images.

11. The information processing apparatus according to claim 10, wherein the memory stores further instructions which, when executed by the at least one processor, cause the at least one processor to:

determine whether the arrangement information has already been associated with the designated group of images;

when the designated group of images is associated with the arrangement information,
update the arrangement information with the designated arranging direction;

when the designated group of images is not associated with the arrangement information,
generating new arrangement information representing the designated arranging direction; and
associating the generated new arrangement information with the designated group of images.

12. The information processing apparatus according to claim 9, wherein the information processing apparatus is connected to a server, and wherein the memory stores instructions which, when executed by the at least one processor, cause the at least one processor to transmit the arrangement information to the server.

13. The information processing apparatus according to claim 9, wherein the memory stores further instructions which, when executed by the at least one processor, cause the at least one processor to:

when the group of images are portrait-oriented and the display area of the displaying device is landscape-oriented, or when the group of images are landscape-oriented and the display area of the displaying device is portrait-oriented, judging whether a difference between an aspect ratio of the designated group of images and an aspect ratio of the display area is equal to or more than a predetermined reference value; and changing the predetermined default arranging direction to a direction in parallel with a direction in which a shorter side of the designated group of images extends if the difference between the aspect ratio of the designated group of images and the aspect ratio of the display area is equal to or more than the predetermined reference value.

14. A method of displaying a group of images on a displaying device of an information processing apparatus, the method comprising:

receiving, by the information processing apparatus, a designation of the group of images to be displayed on the displaying device and scrollable via the displaying device;

determining, by the information processing apparatus, whether arrangement information representing an arranging direction of images when displayed on the displaying device and a scrolling direction for scrolling the images is associated with the designated group of images; and when the designated group of images is associated with the arrangement information,
determining, by the information processing apparatus, whether a device-type of the information processing apparatus is a first device-type or a second device-type;
determining, by the information processing apparatus, whether the arranging direction represented by the arrangement information associated with the designated group of images is permitted for the determined device-type; and
in response to determining that the arranging direction is not permitted for the determined device-type, displaying, by the information processing apparatus, a first portion the designated group of images on the displaying device as virtually arranged in a predetermined default arranging direction of the determined device-type and scrollable in a direction along the predetermined default arranging direction; and when the designated group of images is not associated with the arrangement information, displaying the first portion of the designated group of images on the displaying device as virtually arranged in the predetermined default arranging direction and scrollable in the direction along the predetermined default arranging direction, wherein the arranging direction in parallel with a longer side of a display area of the displaying device is not permitted for the first device-type, wherein a predetermined default arranging direction of the first device-type is a direction in parallel with a shorter side of the display area, and wherein a predetermined default arranging direction of the second device-type is a direction in parallel with the longer side of the display area.

* * * * *